C. M. CAREW.
PORTABLE INVOICE ROD.
APPLICATION FILED APR. 22, 1912.
1,089,188. Patented Mar. 3, 1914.
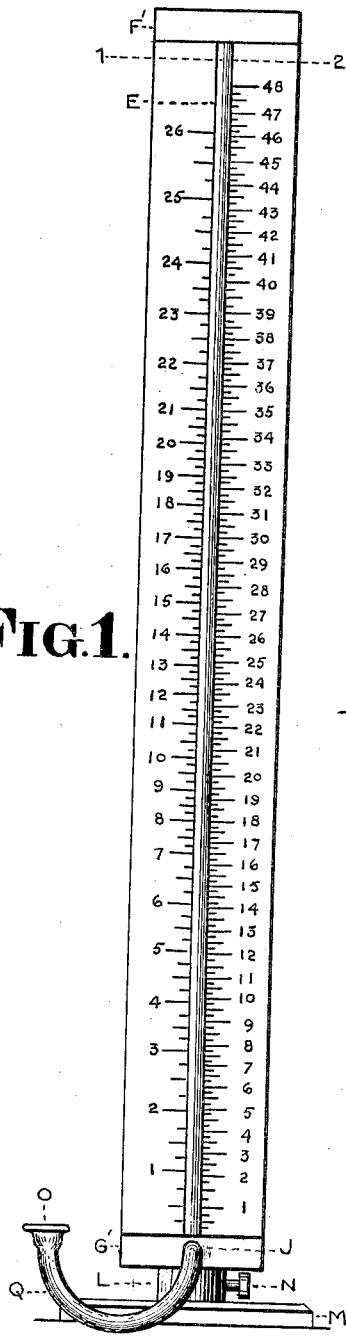
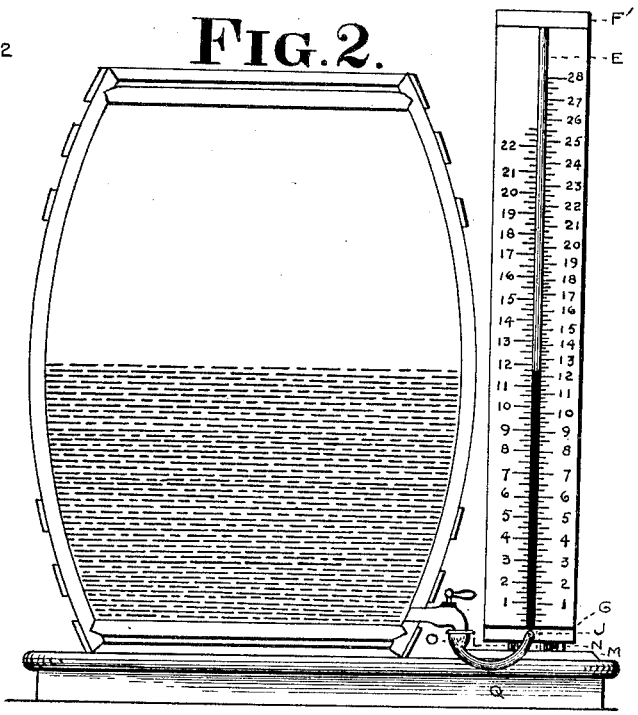
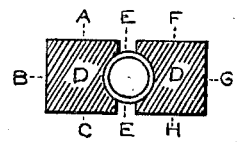
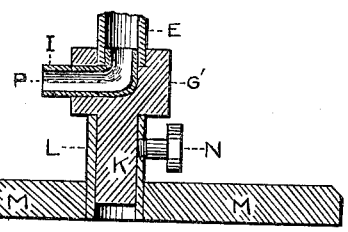
WITNESSES:
Inventor,
Clement M. Carew.
By [signature] Atty.
COLUMBIA PLANOGRAPH CO., WASHINGTON, D. C.

UNITED STATES PATENT OFFICE.

CLEMENT M. CAREW, OF TITUSVILLE, PENNSYLVANIA.

PORTABLE INVOICE-ROD.

1,089,188.  Specification of Letters Patent.  Patented Mar. 3, 1914.

Application filed April 22, 1912. Serial No. 692,471.

*To all whom it may concern:*

Be it known that I, CLEMENT M. CAREW, a citizen of the United States, residing at Nos. 48-50 South Washington street, in the city of Titusville, county of Crawford, and State of Pennsylvania, have invented new and useful improvements in the design and workings of portable invoice-rods for use in the frequent gaging and checking of the contents of opaque packages, barrels, or similar receptacles of standard size and gage in which it is customary to store liquors or other merchandise in a fluid state, of which the following is a specification.

My invention relates to that class of portable invoice rods which are used in connection with the accurate gaging of spirituous liquors, or other merchandise in a fluid state.

My invention is particularly desirable and advantageous owing to the manner in which it is constructed; its adaptability for the purpose named, and the facility with which it can be slipped over and removed from the spout of the faucet, or other device, through which the contents of the package, or barrel are withdrawn. The various sizes of standard gage packages to which it is applicable, and the convenience of having combined in one portable implement, different permanent scales of measurement, showing the proportionate parts of quarts and gallons, of wine measure, also serve to enhance the commercial value of the device.

The utility of my invention, for accurately measuring and checking the fluid contents of standard sizes of broken packages, so called, at frequent intervals, and especially where a number of barrels is placed in an upright position, standing on end, becomes apparent when we compare the same with the system now in general use.

The object of my invention is to provide, at a reasonable cost, a device which will dispense with the inconvenience of existing methods.

Another object of my invention is the provision of an invoice rod adapted for use in connection with receptacles of standard size which will accurately and quickly indicate the amount of liquid contained therein, and which rod will have a series of graduated scales for measuring the liquid in any desired quantity or proportion.

Another object of my invention is the provision of an invoice rod which will be capable of adjustment vertically to insure the proper positioning of the rod with respect to the base of the receptacle to be measured.

A further object of my invention is the provision of an invoice rod which will be applicable to any size of receptacle, which will be portable, and which will be of inexpensive and simple construction to insure a thoroughly practical and satisfactory device of this character.

To attain the desired objects, my invention broadly stated, consists in the provision of an invoice rod embodying in combination with a suitable graduated support, a measuring tube carried thereby, means for adjusting said support vertically, and a flexible connection between said tube and the outlet of the receptacle to be measured.

My invention further resides in certain novel features of construction and combination of parts, substantially as shown, described and claimed hereinafter, reference now being had to the accompanying drawings in which I have illustrated an invoice rod constructed in accordance with and embodying the principles of my invention.

Figure 1 is a front elevation of an invoice rod constructed in accordance with and embodying the principles of my invention. Fig. 2 is a similar view showing the rod applied to a barrel, the barrel being in section, and the height of the contents thereof being indicated by the heavy line of the glass sight tube. Fig. 3 is a cross section on line 1—2 of Fig. 1, and Fig. 4 is a cross section through the base of the support, illustrating the connection with the tube and the method of adjusting the support in a vertical direction the scale rods or strips being omitted.

In the drawings, in which similar letters of reference denote corresponding parts in the several views: The letters D—D designate the supporting rods, each having three exposed faces A, B, C, and F, G, H, respectively, the faces C and H bearing suitable scales of measurement thereon. The rods D—D have their inner faces shaped to conform with the contour of the glass tube E, mounted therebetween and thus protected from breakage. A metallic ferrule F' is rigidly fitted to the top of the supporting members D—D, metallic ferrule G' is fitted to the lower end of said members.

The scale rods D, D, are secured to the connecting pieces F' and G' in any suitable manner rigidly to retain the said strips in proper place. The connecting piece G' has a vertical opening therein in which the lower end of the tube E is seated and has a horizontal opening in which is received the elbow-shaped tube P, which extends beyond one face of the connecting piece G' and forms a nipple I, to which the similar end J of the elastic tube Q is connected, said tube Q having a flared end O for attachment to the faucet of a barrel or other liquid containing receptacle.

The connecting piece G' is shouldered upon its under side to form a reduced extension K fitting within the sleeve L on the base M of the standard, and said sleeve is engaged by the set screw N to adjust the standard.

From this construction, it will be seen that the device is of simple and inexpensive construction and may be easily carried from place to place to measure the contents of the barrel, and in operation the tube Q is connected with the faucet of the barrel and the liquid flows into the glass sight tube E until it has attained a level equal to that of the liquid in the barrel. This level is easily read by reason of the graduations on the supports for the tube E, and the contents of the barrel may thus be readily determined. The scales on the supporting rods may be of any desired character and contain any desired sets of graduations, while the rods may be adjusted vertically with respect to the barrel to insure the standards or rods being disposed at a level equal to that of the base of the barrel.

From the foregoing description, the construction and operation of my improved invoice rod will be readily understood, and its many advantages and points of merit over devices now in use will be quickly appreciated, and it will be also apparent that modifications coming within the spirit and scope of my invention, as defined by the appended claims, may be resorted to when found necessary and desirable.

I claim:

In an invoice rod, the combination with proximate parallel scale strips having each a groove in its inner face, a gage tube fitting in said grooves, a connecting-piece connecting the scale strips at the top, a connecting piece connecting said scale strips at the bottom, said bottom connecting piece having a depending extension and also an opening at one side, a broad base having a sleeve to receive the extension in said bottom connecting-piece, a finger-operated clamping screw in the sleeve to engage the extension for securing the device to the base, and a flexible tube connected with the opening in the side of the bottom connecting piece.

CLEMENT M. CAREW.

Witnesses:
JAMES EDWIN MURRAY,
FRED. S. TYLER.

---

Copies of this patent may be obtained for five cents each, by addressing the "Commissioner of Patents, Washington, D. C."